US012775280B2

(12) United States Patent
Zhang

(10) Patent No.: US 12,775,280 B2
(45) Date of Patent: Oct. 27, 2026

(54) AUTOPILOT PLATFORM FOR SMALL UNMANNED HELICOPTER

(71) Applicant: Tibet Chuangbo General Aviation Technology Co., Ltd., Shannan (CN)

(72) Inventor: Bo Zhang, Shannan (CN)

(73) Assignee: Tibet Chuangbo General Aviation Technology Co., Ltd., Shannan (CN)

(*) Notice: Subject to any disclaimer, the term of this patent is extended or adjusted under 35 U.S.C. 154(b) by 12 days.

(21) Appl. No.: 19/074,299

(22) Filed: Mar. 7, 2025

(65) Prior Publication Data

US 2025/0208626 A1 Jun. 26, 2025

(30) Foreign Application Priority Data

Jan. 16, 2025 (CN) ......................... 202510081321.7

(51) Int. Cl.
*G05D 1/495* (2024.01)
*B64U 10/17* (2023.01)

(52) U.S. Cl.
CPC ............. *G05D 1/496* (2024.01); *B64U 10/17* (2023.01); *B64U 2201/10* (2023.01)

(58) Field of Classification Search
None
See application file for complete search history.

(56) References Cited

U.S. PATENT DOCUMENTS

2006/0058928 A1* 3/2006 Beard .................. G01C 23/005 244/175
2013/0338915 A1* 12/2013 Mizuochi ............. G01C 25/005 701/500
2016/0349058 A1* 12/2016 Yu ............................ H01Q 3/02
2018/0292842 A1* 10/2018 Yu ........................ G05D 1/0858
2019/0369742 A1* 12/2019 Ghazanfari ........... G06T 19/003
2021/0072084 A1* 3/2021 Takahashi ......... G02F 1/133509
(Continued)

FOREIGN PATENT DOCUMENTS

CN 113218391 A * 8/2021 ............. G01C 21/18
CN 115597588 A * 1/2023 ........... G01C 21/165
(Continued)

*Primary Examiner* — Redhwan K Mawari
*Assistant Examiner* — Nada Mahyoob Alqaderi

(57) ABSTRACT

An autopilot platform for a small unmanned helicopter comprises a high-precision micro-electromechanical sensor module for acquiring angular velocity, acceleration and inclination data in real time; an attitude solving module for updating a quaternion in real time and performs normalization using a rotation quaternion method and a fourth-order Runge-Kutta numerical integration method; a data fusion module for fusing data from a gyroscope, an accelerometer and an inclinometer on the basis of a complementary filtering algorithm to correct an attitude solving error, compensate for low sensor precision and susceptibility to noise interference, and ensure the long-term stability and dynamic precision of attitude information; and an attitude control module using a cascade PID controller to hierarchically process outer loop attitude angle control and inner loop angular velocity control, which solves the dynamic coupling problem in attitude control and significantly improves the system's dynamic response performance and anti-disturbance capability.

10 Claims, 2 Drawing Sheets

(56) References Cited

U.S. PATENT DOCUMENTS

| | | | | |
|---|---|---|---|---|
| 2021/0191426 | A1* | 6/2021 | Yu | G05D 1/0858 |
| 2022/0083054 | A1* | 3/2022 | Summer | G05D 1/0016 |
| 2022/0324572 | A1 | 10/2022 | Alzahrani | |
| 2022/0326720 | A1* | 10/2022 | He | G05D 1/046 |
| 2023/0176590 | A1 | 6/2023 | Playle et al. | |

FOREIGN PATENT DOCUMENTS

| | | | | | |
|---|---|---|---|---|---|
| CN | 111551175 | B | * | 3/2024 | G01C 21/18 |
| WO | WO-2013169320 | A2 | * | 11/2013 | B64C 27/68 |
| WO | WO-2020142561 | A1 | * | 7/2020 | F41H 7/005 |

* cited by examiner

AUTOPILOT PLATFORM FOR SMALL UNMANNED HELICOPTER

CROSS-REFERENCE TO RELATED APPLICATIONS

This application claims priority to Chinese Patent Application No. CN 202510081321.7, filed on Jan. 16, 2025. The content of the aforementioned application, including any intervening amendments thereto, is incorporated herein by reference.

FIELD

The present application relates to the technical field of autopilot of small unmanned helicopters, and in particular, to an autopilot platform for a small unmanned helicopter.

BACKGROUND

With the rapid development of drone technology, the application of a drone in military, agriculture, surveying and mapping, logistics and other fields is gradually increasing. An autopilot platform, as the core control system of the drone, directly determines the flight performance and mission execution capability of the drone. Especially in the field of small unmanned helicopters, due to its complex flight attitude and high dynamic response requirements, the autopilot platform needs to have high-precision attitude solving and control functions to ensure the stability and safety of the aircraft in various working environments.

At present, for the autopilot control of small unmanned helicopters, the traditional proportion integration differentiation (PID) control algorithm is usually used to control an attitude angle and an angular velocity. However, due to the coupling characteristic between the attitude angles of a helicopter, it's difficult for the traditional PID algorithm to effectively handle the problem of dynamic coupling of attitude control, resulting in a slow dynamic response and a poor anti-disturbance capability of a control system. In addition, during an attitude solving process, due to the limited precision of a micro-electromechanical (MEMS) sensor, the measurement data are susceptible to noise and environmental interference, thereby leading to the reduced precision and reliability of the attitude solving. Moreover, the traditional attitude solving has a large amount of calculations and poor real-time performance, which makes it difficult to meet the high real-time attitude control demands of small unmanned helicopters.

Therefore, in the attitude control of small unmanned helicopters, obvious dynamic coupling characteristics, limited sensor precision, and poor real-time performance of the attitude solving have become urgent problems that need to be addressed.

SUMMARY

The present application provides an autopilot platform for a small unmanned helicopter, which is intended to solve the problems of obvious dynamic coupling characteristics, limited sensor precision, and poor real-time performance of attitude solving in the existing attitude control of small unmanned helicopters.

An autopilot platform for a small unmanned helicopter comprises:

- a high-precision micro-electromechanical sensor module configured to acquire real-time angular velocity, acceleration and inclination data of the small unmanned helicopter;
- an attitude solving module configured to solve an attitude by a rotation quaternion method and update a rotation quaternion in real time;
- a data fusion module configured to fuse the angular velocity, acceleration and inclination data;
- an attitude control module comprising a cascade PID controller, with an outer loop being configured to calculate an angular velocity reference value from an attitude angle error, and an inner loop being configured to calculate a control signal from an angular velocity error; and
- an actuator control module configured to drive a steering gear according to the control signal to adjust pitch, roll and yaw attitudes of the small unmanned helicopter.

In the solution hereinabove, optionally, the attitude solving module solves an attitude on the basis of the rotation quaternion method, specifically using the following formula:

$$\dot{q} = \begin{bmatrix} \dot{\lambda} \\ \dot{p}_1 \\ \dot{p}_2 \\ \dot{p}_3 \end{bmatrix} = \frac{1}{2}\begin{bmatrix} 0 & -\omega_x & -\omega_y & -\omega_z \\ \omega_x & 0 & -\omega_z & -\omega_y \\ \omega_y & -\omega_z & 0 & \omega_x \\ \omega_z & \omega_y & -\omega_x & 0 \end{bmatrix}\begin{bmatrix} \lambda \\ p_1 \\ p_2 \\ p_3 \end{bmatrix}$$

where $\dot{q}$, as a derivative of a state vector, indicates the change of a system state over time and is configured to describe the change in attitude of an object; $\lambda$ is a real part of the quaternion, and $p_1$, $p_2$, and $p_3$ constitute an imaginary part of the quaternion, that is, $q=\lambda+p_1i+p_2j+p_3k$; $\omega=\omega_xi+\omega_yj+\omega_zk$ is the projection, in a carrier coordinate system, of a rotational angular velocity of the carrier coordinate system relative to a navigation coordinate system, and $\omega_x$, $\omega_y$ and $\omega_z$ are rotation velocity components of the angular velocity on an x-axis, a y-axis and a z-axis.

In the solution hereinabove, optionally, the attitude solving module performs coordinate transformation on the angular velocity to obtain the following formula:

$$\begin{bmatrix} \omega_x \\ \omega_y \\ \omega_z \end{bmatrix} = \begin{bmatrix} \omega_{xx} \\ \omega_{yy} \\ \omega_{zz} \end{bmatrix} - C_n^b\begin{bmatrix} \omega_1 \\ \omega_2 \\ \omega_3 \end{bmatrix}$$

where $\omega_x$, $\omega_y$ and $\omega_z$ are angular velocity components in the carrier coordinate system, $[\omega_{xx}\ \omega_{yy}\ \omega_{zz}]^T$ is a gyro output angular velocity, $$C_n^b$$

is an attitude matrix, and $[\omega_1\ \omega_2\ \omega_3]^T$ is the sum of the projection, in the navigation coordinate system, of a rotational angular velocity of the earth and the projection, in the navigation coordinate system, of a rotational angular velocity of the navigation coordinate system relative to an earth coordinate system.

In the solution hereinabove, optionally, the attitude solving module integrates a quaternion derivative by a fourth-order Runge-Kutta method and updates the quaternion in real time.

In the solution hereinabove, optionally, the attitude solving module normalizes the updated quaternion to ensure that a norm of the quaternion is 1.

In the solution hereinabove, optionally, the data fusion module fuses data from a gyroscope, an accelerometer and an inclinometer using a complementary filtering algorithm to correct an attitude solving error.

In the solution hereinabove, optionally, the cascade PID controller comprises: an outer loop PID controller configured to calculate an angular velocity reference value from an attitude angle error; and an inner loop PID controller configured to calculate an output control signal from an angular velocity error.

In the solution hereinabove, optionally, inner loop and outer loop calculation frequencies of the cascade PID controller are both 50 Hz.

In the solution hereinabove, optionally, the actuator control module drives the steering gear through a pulse-width modulation (PWM) signal to adjust the pitch, roll and yaw attitudes of the small unmanned helicopter.

In the solution hereinabove, optionally, the platform is suitable for solving the problem of coupling in pitch, roll and yaw three-axis attitude control.

Compared with the prior art, the present application has at least the following advantageous effects:

The present application, on the basis of further analysis and research on the existing technical problem, recognizes the problems of obvious dynamic coupling characteristics, limited sensor precision, and poor real-time performance of the attitude solving in the attitude control of the existing small unmanned helicopter. The high-precision micro-electromechanical sensor module acquires the angular velocity, acceleration and inclination data in real time, and the attitude solving module updates the quaternion in real time and performs normalization using a rotation quaternion method and a fourth-order Runge-Kutta numerical integration method, which effectively improves the precision and real-time performance of the attitude solving and solves the problems of insufficient real-time performance and low precision of the attitude solving in the background art. The data fusion module fuses data from a gyroscope, an accelerometer and an inclinometer on the basis of a complementary filtering algorithm to correct the attitude solving error, compensate for low sensor precision and susceptibility to noise interference, and ensure the long-term stability and dynamic precision of attitude information. The attitude control module uses the cascade PID controller to hierarchically process outer loop attitude angle control and inner loop angular velocity control, which solves the problem of dynamic coupling in attitude control and significantly improves the system's dynamic response performance and anti-disturbance capability. The actuator control module drives the steering gear through the PWM signal to achieve independent control of the pitch, roll and yaw three-axis attitudes, ensuring the flight stability and control precision of the unmanned helicopter in a complex environment.

In summary, the present disclosure effectively solves the problems mentioned in the background art such as the low sensor precision, the poor real-time performance of the attitude solving and the dynamic coupling of the attitude control, and significantly improves the stability, precision and real-time response performance of the autopilot platform for an unmanned helicopter.

DETAILED DESCRIPTION OF THE EMBODIMENTS

In order to make the purposes, technical solutions and advantages of the present application clearer, the present application will be further illustrated in detail below with reference to the drawings and embodiments. It should be understood that the specific embodiments described here are only used to explain the present application and are not intended to limit the present application.

Figure 1:
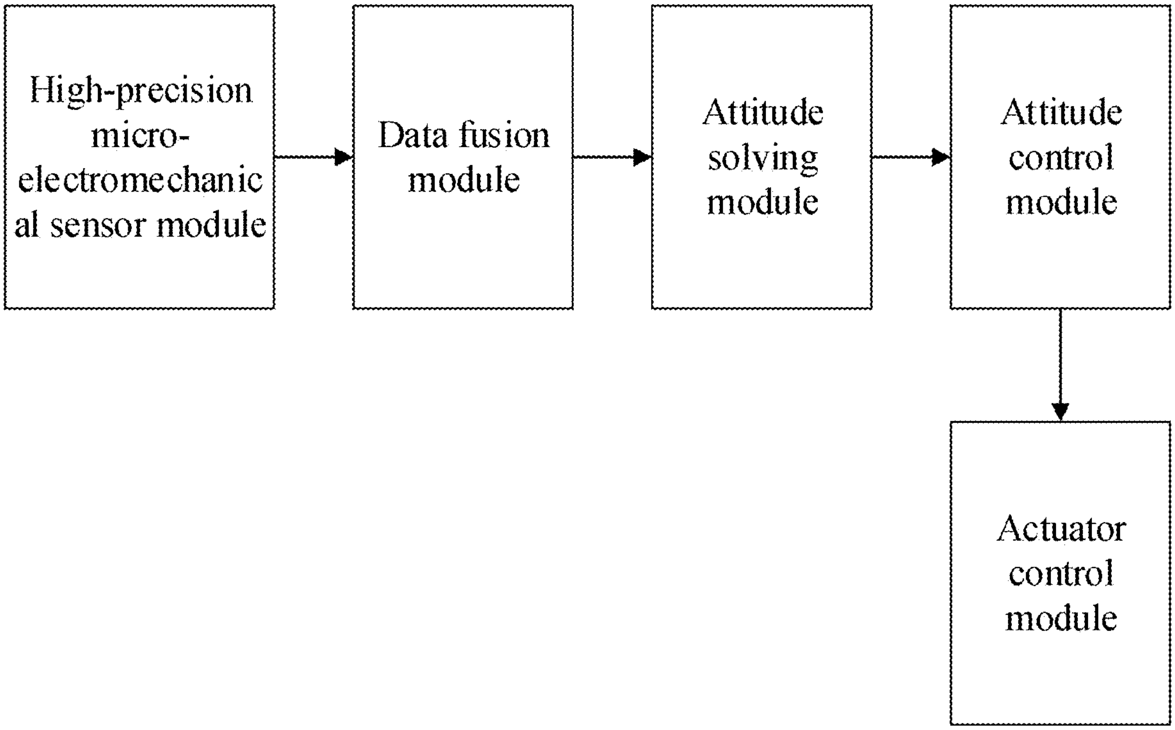
FIG. 1 is a block diagram of a module architecture of an autopilot platform device for a small unmanned helicopter according to an embodiment of the present application.

In one embodiment, as shown in FIG. 1, there is provided an autopilot platform for a small unmanned helicopter, comprising:

- a high-precision micro-electromechanical sensor module configured to acquire real-time angular velocity, acceleration and inclination data of the small unmanned helicopter;
- an attitude solving module configured to solve an attitude by a rotation quaternion method and update a rotation quaternion in real time;
- a data fusion module configured to fuse the angular velocity, acceleration and inclination data;
- an attitude control module comprising a cascade PID controller, with an outer loop being configured to calculate an angular velocity reference value from an attitude angle error, and an inner loop being configured to calculate a control signal from an angular velocity error; and
- an actuator control module configured to drive a steering gear according to the control signal to adjust pitch, roll and yaw attitudes of the small unmanned helicopter.

The high-precision micro-electromechanical sensor module in this embodiment comprises a gyroscope, an accelerometer and an inclinometer which are mainly configured to acquire the real-time angular velocity, acceleration and inclination data of the small unmanned helicopter. These sensors perform different measurement functions respectively:

- the gyroscope provides angular velocity information of an aircraft and is suitable for short-term dynamic attitude measurement; and
- the accelerometer and the inclinometer provide attitude angle data and are suitable for long-term static attitude stability measurement.

This embodiment can collect state data of the aircraft in real time through the high-precision sensor module, providing high dynamic performance and high precision attitude angle and angular velocity measurements. Although the MEMS sensor have certain limitations in precision, when used in combination with the subsequent data fusion module, it can effectively reduce sensor noise interference and error effects, solving the problems of low sensor precision and susceptibility to interference as mentioned in the background art.

In this embodiment, the attitude solving module solves an attitude on the basis of the rotation quaternion method, specifically using the following formula:

$$\dot{q} = \begin{bmatrix} \dot{\lambda} \\ \dot{p}_1 \\ \dot{p}_2 \\ \dot{p}_3 \end{bmatrix} = \frac{1}{2} \begin{bmatrix} 0 & -\omega_x & -\omega_y & -\omega_z \\ \omega_x & 0 & -\omega_z & -\omega_y \\ \omega_y & -\omega_z & 0 & \omega_x \\ \omega_z & \omega_y & -\omega_x & 0 \end{bmatrix} \begin{bmatrix} \lambda \\ p_1 \\ p_2 \\ p_3 \end{bmatrix}$$

where $\dot{q}$, as a derivative of a state vector, indicates the change of a system state over time and is configured to describe the change in attitude of an object; $\lambda$ is a real part of the quaternion, and $p_1$, $p_2$, and $p_3$ constitute an imaginary part of the quaternion, that is, $q=\lambda+p_1i+p_2j+p_3k$; $\omega=\omega_xi+\omega_yj+\omega_zk$ is the projection, in a carrier coordinate system, of a rotational angular velocity of the carrier coordinate system relative to a navigation coordinate system, and $\omega_x$, $\omega_y$ and $\omega_z$ are rotation velocity components of the angular velocity on an x-axis, a y-axis and a z-axis.

In this embodiment, the attitude solving module performs coordinate transformation on the angular velocity to obtain the following formula:

$$\begin{bmatrix}\omega_x\\ \omega_y\\ \omega_z\end{bmatrix}=\begin{bmatrix}\omega_{xx}\\ \omega_{yy}\\ \omega_{zz}\end{bmatrix}-C_n^b\begin{bmatrix}\omega_1\\ \omega_2\\ \omega_3\end{bmatrix}$$

where $\omega_x$, $\omega_y$ and $\omega_z$ are angular velocity components in the carrier coordinate system, $[\omega_{xx}\ \omega_{yy}\ \omega_{zz}]^T$ is a gyro output angular velocity, $$C_n^b$$

is an attitude matrix, and $[\omega_1\ \omega_2\ \omega_3]^T$ is the sum of the projection, in the navigation coordinate system, of a rotational angular velocity of the earth and the projection, in the navigation coordinate system, of a rotational angular velocity of the navigation coordinate system relative to an earth coordinate system.

In this embodiment, the attitude solving module integrates a quaternion derivative by a fourth-order Runge-Kutta method and updates the quaternion in real time.

In this embodiment, the attitude solving module normalizes the updated quaternion to ensure that a norm of the quaternion is 1.

In this embodiment, the data fusion module fuses the data from the gyroscope, the accelerometer and the inclinometer using a complementary filtering algorithm to correct an attitude solving error.

In this embodiment, the cascade PID controller comprises:

- an outer loop PID controller configured to calculate an angular velocity reference value from an attitude angle error; and
- an inner loop PID controller configured to calculate an output control signal from an angular velocity error.

In this embodiment, inner loop and outer loop calculation frequencies of the cascade PID controller are both 50 Hz.

In this embodiment, the actuator control module drives the steering gear through a PWM signal to adjust the pitch, roll and yaw attitudes of the small unmanned helicopter.

In this embodiment, the platform is suitable for solving the problem of coupling in pitch, roll and yaw three-axis attitude control.

This embodiment uses the rotation quaternion method for attitude solving, which can effectively solve the singularity problem that occurs with the traditional Euler angle method when the attitude changes at a large angle. Especially when the aircraft performs complex attitude maneuvers, the attitude information can still maintain continuity and accuracy. The quaternion method avoids redundant calculations in three-dimensional coordinate rotation, thereby greatly reducing the amount of calculations during a solving process and enabling the system to run efficiently in a resource-constrained embedded environment. In addition, since the formula is updated directly on the basis of the angular velocity components, the rotation quaternion method can quickly respond to the changes in attitude angle and meet the high real-time and dynamic precision requirements of the small unmanned helicopter.

Numerical integration by the Runge-Kutta method can significantly improve the calculation precision of quaternion updating, reduce cumulative errors, and ensure the stability and consistency of attitude solving results during long-term flights. In addition, since the unitarity of the quaternion is maintained, the problem of numerical divergence will not occur during the solving process, thereby improving the reliability of the system. In general, with the attitude solving method, the autopilot platform for a small unmanned helicopter can achieve high-precision and real-time attitude information output in a highly dynamic flight environment, effectively solving the problems of poor real-time performance and low precision of attitude solving in the background art.

By performing the coordinate transformation on the angular velocity data, this embodiment solves the problem of coordinate mismatch between the angular velocity outputted by the MEMS sensor and the attitude solving model, ensuring that the attitude solving module can accurately process the data outputted by the sensor. Since there is a constantly changing relationship between the navigation coordinate system and the carrier coordinate system during flight, the coordinate system transformation process can dynamically adapt to real-time changes in the system attitude, further improving the accuracy of the solving result.

In addition, this coordinate transformation formula can eliminate the impact caused by sensor installation errors or coordinate system offsets, ensure the uniformity and consistency of the angular velocity data, and provide reliable input data for attitude solving. In combination with high-precision numerical operation and filtering optimization technologies, the coordinate system transformation process will not introduce additional errors, ensuring that the system has high calculation precision and stability during real-time running. In general, the angular velocity coordinate transformation method effectively solves the problem of coordinate differences between sensor data and a solving model, improves the precision and real-time performance of attitude solving, and meets the requirements of the small unmanned helicopter in highly dynamic flight missions.

In this embodiment, by setting both the inner and outer loop calculation frequencies of the cascade PID controller to 50 Hz, the real-time performance and control coordination of the system can be effectively improved. The outer loop attitude angle control and the inner loop angular velocity control are updated in the same time step, ensuring data transfer and response synchronization between the two control loops, thereby avoiding lag during control. In addition, the unified calculation frequency simplifies the design and implementation of the controller, reduces the complexity of the system, and helps stable running in the embedded environment.

The calculation frequency of 50 Hz meets the real-time control requirements of the small unmanned helicopter and can quickly respond to attitude changes during the dynamic flight, thereby ensuring the real-time performance and stability of attitude control. Moreover, such calculation frequency also balances the control precision of the system and the consumption of calculation resources, ensuring that the controller runs efficiently on an embedded hardware platform and will not cause system delays or crashes due to an excessive calculation load.

In summary, by setting both the inner and outer loop calculation frequencies of the cascade PID controller to 50 Hz, the problem of control output lag and incoordination between different control loops is solved, thereby effectively improving the real-time response capability and control performance of the system and ensuring the attitude stability and dynamic control precision of the small unmanned helicopter in the complex flight environment.

In one embodiment, a control center of a drone is provided as the autopilot platform. Therefore, during the design of the autopilot platform, the design functions of the autopilot should be determined on the basis of the type of aircraft, mission requirements and the like. The autopilot control of the small unmanned helicopter comprises flight trajectory control and flight attitude control. The main tasks are collection and processing of the data from various sensors, real-time solving of the attitude angle, and outputting of the PWM signal based on the control algorithm so as to drive the steering gear to control the flight attitude of the aircraft in real time to achieve closed-loop control. The flight trajectory control is achieved through the flight attitude control. Therefore, the attitude control is the core in the design of the autopilot platform for a miniature unmanned helicopter.

The hardware design of the autopilot platform for an unmanned helicopter uses high-precision micro-electromechanical (MEMS) sensors. Moreover, an attitude update solving algorithm is the core of the platform system. The conventional method of determining the attitude is to calculate a direction cosine matrix of the carrier coordinate system associated with the navigation coordinate system, or use an efficient numerical integration algorithm to calculate the equivalent quaternion. The platform updates the attitude matrix in real time using the rotation quaternion method and corrects the attitude solving error using the multi-sensor information fusion technology on the basis of complementary filtering. The platform is also used to compensate for the low precision and susceptibility to interference of the MEMS sensors themselves. In order to improve the real-time performance of the attitude solving, the fourth-order Runge·Kutta method, in combination with the cascade PID control algorithm of the pitch, roll and yaw axes of the helicopter, is used to update the rotation quaternion.

After the initial quaternion is determined according to the Euler angle and quaternion conversion formula, the quaternion can be updated in real time through the following calculation formula.

$$\dot{q}=\begin{bmatrix}\dot{\lambda}\\ \dot{p}_1\\ \dot{p}_2\\ \dot{p}_3\end{bmatrix}=\frac{1}{2}\begin{bmatrix}0 & -\omega_x & -\omega_y & -\omega_z\\ \omega_x & 0 & -\omega_z & -\omega_y\\ \omega_y & -\omega_z & 0 & \omega_x\\ \omega_z & \omega_y & -\omega_x & 0\end{bmatrix}\begin{bmatrix}\lambda\\ p_1\\ p_2\\ p_3\end{bmatrix}$$

where $\omega=\omega_x i+\omega_y j+\omega_z k$ is the projection, in the carrier coordinate system, of a rotational angular velocity of the carrier coordinate system relative to the navigation coordinate system, and the gyro output angular velocity on the carrier measures the projection, in the carrier coordinate system, of the angular velocity of the carrier coordinate system relative to an inertial system, so it must be transformed before it can be used for the update calculation of the attitude matrix. The transformation is as follows:

$$\begin{bmatrix}\omega_x\\ \omega_y\\ \omega_z\end{bmatrix}=\begin{bmatrix}\omega_{xx}\\ \omega_{yy}\\ \omega_{zz}\end{bmatrix}-C_n^b\begin{bmatrix}\omega_1\\ \omega_2\\ \omega_3\end{bmatrix}$$

In order to ensure the "unitarity" of the quaternion, normalization processing is also added to the autopilot program to ensure that the norm of the quaternion is 1. The data complementation method of fusing an output value of the accelerometer and the gyroscope attitude angle and the inclinometer attitude angle is then used to provide the attitude information with long-term high precision and good dynamic performance for subsequent attitude control.

The attitude control of the unmanned helicopter requires high precision, and there are certain coupling characteristics between the attitude angles. The traditional digital PID algorithm cannot meet the control requirements, while the cascade digital PID control algorithm can better meet the precision requirements. The cascade digital PID controller connects two digital PID controllers in series, wherein the output of one controller is used as the input of the other controller. Compared with a single-stage digital PID controller, the cascade digital PID controller improves the dynamic characteristics of the control process, improves the system control quality, can quickly overcome the secondary disturbance entering a subloop, increases the system's operating frequency, and has strong adaptability to load changes.

Figure 2:
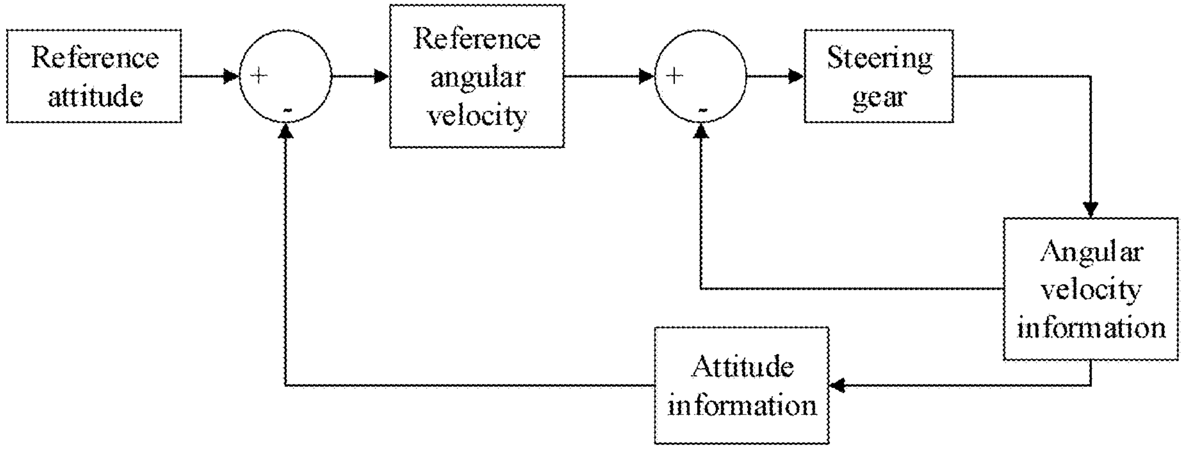
FIG. 2 is a schematic diagram of a serial digital PID controller according to an embodiment of the present application.

The autopilot platform system uses the cascade PID control algorithm for stability control of the attitudes of roll, pitch and yaw channels. Since the angular velocity is updated faster than the pitch angle value and pitch angle velocity, the angular velocity control with a faster response speed is placed in the inner loop, while the attitude control with a slower response speed is placed in the outer loop, forming the cascade digital PID controller, as shown in FIG. 2.

The cascade digital PID control starts with the outer loop (attitude loop) followed by the inner loop (angular velocity loop). First, a reference pitch angle is given by a calibrated hovering pitch angle value. After outer loop digital PID calculation, a reference value of the pitch axis angular velocity is obtained. After the reference value is outputted following inner loop digital PID calculation and is used to control a servo system, the helicopter can follow the reference angular velocity and in turn follow the reference value of the pitch angle. In order to meet the faster inner loop control, the inner and outer loop calculation frequencies are designed to be the same, both 50 Hz, which fully meets the control frequency requirements of an inert system of the unmanned helicopter. According to the characteristics of helicopter control, the traditional PID algorithm is improved and cascade PID is used to achieve cascade control of the angular velocity and the attitude angle on the inner and outer loops.

The present application, on the basis of further analysis and research on the existing technical problem, recognizes the problems of obvious dynamic coupling characteristics, limited sensor precision, and poor real-time performance of the attitude solving in the attitude control of the existing small unmanned helicopter. The high-precision micro-electromechanical sensor module acquires the angular velocity, acceleration and inclination data in real time, and the attitude solving module updates the quaternion in real time and performs normalization using a rotation quaternion method and a fourth-order Runge-Kutta numerical integration method, which effectively improves the precision and real-time performance of the attitude solving and solves the problems of insufficient real-time performance and low precision of the attitude solving in the background art. The data fusion module fuses data from a gyroscope, an accelerometer and an inclinometer on the basis of a complementary filtering algorithm to correct the attitude solving error, compensate for low sensor precision and susceptibility to noise interference, and ensure the long-term stability and dynamic precision of attitude information. The attitude control module uses the cascade PID controller to hierarchically process outer loop attitude angle control and inner loop angular velocity control, which solves the dynamic coupling problem in attitude control and significantly improves the system's dynamic response performance and anti-disturbance capability. The actuator control module drives the steering gear through the PWM signal to achieve independent control of the pitch, roll and yaw three-axis attitudes, ensuring the flight stability and control precision of the unmanned helicopter in a complex environment.

In summary, the embodiments effectively solve the problems mentioned in the background art such as the low sensor precision, the poor real-time performance of the attitude solving and the dynamic coupling of the attitude control, and significantly improve the stability, precision and real-time response performance of the autopilot platform for an unmanned helicopter.

The technical features of the embodiments hereinabove may be combined arbitrarily. For brevity of description, not all possible combinations of the technical features in the embodiments hereinabove are described. However, the combinations of these technical features should be construed as falling within the scope described in this specification as long as there is no contradiction.

What is claimed is:

1. An autopilot platform for a small unmanned helicopter, wherein the platform comprises:

a high-precision micro-electromechanical sensor (MEMS) module comprising a gyroscope, an accelerometer, and an inclinometer, the MEMS module being configured to acquire real-time angular velocity, acceleration and inclination data of the small unmanned helicopter; and a flight controller comprising a flight processor coupled to a memory and the MEMS module, the memory storing instructions that, when executed by the flight processor, configure the flight processor to:

solve an attitude by a rotation quaternion method and update a rotation quaternion in real time;

fuse the angular velocity, acceleration and inclination data;

execute a cascade proportion integration differentiation (PID) controller, with an outer loop being configured to calculate an angular velocity reference value from an attitude angle error, and an inner loop being configured to calculate a control signal from an angular velocity error; and drive a steering gear according to the control signal to adjust pitch, roll and yaw attitudes of the small unmanned helicopter.

2. The autopilot platform according to claim 1, wherein the flight processor is configured to solve the attitude on the basis of the rotation quaternion method using the following formula:

$$\dot{q}=\begin{bmatrix}\dot{\lambda}\\ \dot{p}_1\\ \dot{p}_2\\ \dot{p}_3\end{bmatrix}=\frac{1}{2}\begin{bmatrix}0 & -\omega_x & -\omega_y & -\omega_z\\ \omega_x & 0 & -\omega_z & -\omega_y\\ \omega_y & -\omega_z & 0 & \omega_x\\ \omega_z & \omega_y & -\omega_x & 0\end{bmatrix}\begin{bmatrix}\lambda\\ p_1\\ p_2\\ p_3\end{bmatrix}$$

where $\dot{q}$, as a derivative of a state vector, indicates the change of a system state over time and is configured to describe the change in attitude of an object; λ is a real part of the quaternion, and $p_1$, $p_2$, and $p_3$ constitute an imaginary part of the quaternion, that is, $q=\lambda+p_1i+p_2j+p_3k$; $\omega=\omega_xi+\omega_yj+\omega_zk$ is the projection, in a carrier coordinate system, of a rotational angular velocity of the carrier coordinate system relative to a navigation coordinate system, and $\omega_x$, $\omega_y$ and $\omega_z$ are rotation velocity components of the angular velocity on an x-axis, a y-axis and a z-axis.

3. The autopilot platform according to claim 2, wherein the flight processor is configured to perform coordinate transformation on the angular velocity to obtain the following formula:

$$\begin{bmatrix}\omega_x\\ \omega_y\\ \omega_z\end{bmatrix}=\begin{bmatrix}\omega_{xx}\\ \omega_{yy}\\ \omega_{zz}\end{bmatrix}-C_n^b\begin{bmatrix}\omega_1\\ \omega_2\\ \omega_3\end{bmatrix}$$

where $\omega_x$, $\omega_y$ and $\omega_z$ are angular velocity components in the carrier coordinate system, $[\omega_{xx}\ \omega_{yy}\ \omega_{zz}]^T$ is a gyro output angular velocity, $$C_n^b$$

is an attitude matrix, and $[\omega_1\ \omega_2\ \omega_3]^T$ is the sum of the projection, in the navigation coordinate system, of a rotational angular velocity of the earth and the projection, in the navigation coordinate system, of a rotational angular velocity of the navigation coordinate system relative to an earth coordinate system.

4. The autopilot platform according to claim 1, wherein the flight processor is configured to integrate a quaternion derivative by a fourth-order Runge-Kutta method and update the quaternion in real time.

5. The autopilot platform according to claim 1, wherein the flight processor is configured to normalize the updated quaternion to ensure that a norm of the quaternion is 1.

6. The autopilot platform according to claim 1, wherein the filtering algorithm executed by the flight processor is a complementary filtering algorithm configured to correct an attitude solving error by fusing data from the gyroscope, the accelerometer, and the inclinometer.

7. The autopilot platform according to claim 1, wherein the cascade PID controller comprises:

an outer loop PID controller configured to calculate an angular velocity reference value from an attitude angle error; and an inner loop PID controller configured to calculate an output control signal from an angular velocity error.

8. The autopilot platform according to claim 7, wherein the inner loop and the outer loop calculation frequencies of the cascade PID controller are both 50 Hz.

9. The autopilot platform according to claim 1, wherein the flight processor is configured to drive the steering gear through a pulse-width modulation (PWM) signal to adjust the pitch, roll and yaw attitudes of the small unmanned helicopter.

10. The autopilot platform according to claim 1, wherein the platform is suitable for solving the problem of coupling in pitch, roll and yaw three-axis attitude control.

* * * * *